United States Patent [19]

Kubota et al.

[11] Patent Number: 5,033,857
[45] Date of Patent: Jul. 23, 1991

[54] METHOD OF TRANSFORMING LIGHT-SOURCE COLOR DATA AND NON-LUMINOUS OBJECT COLOR DATA

[75] Inventors: Junichi Kubota; Naoki Hasegawa, both of Niigata; Masahiro Furuhata, Mitsuke; Kenjiro Watanabe, Niigata, all of Japan

[73] Assignee: Niigata Prefecture, Niigata, Japan

[21] Appl. No.: 378,664

[22] Filed: Jul. 11, 1989

[30] Foreign Application Priority Data

Jul. 12, 1988 [JP] Japan ................................ 63-172937
Jul. 12, 1988 [JP] Japan ................................ 63-172938
Oct. 6, 1988 [JP] Japan ........................... 63-131253[U]

[51] Int. Cl.$^5$ .............................................. G01J 3/46
[52] U.S. Cl. .................................... 356/402; 250/226; 356/408; 356/425
[58] Field of Search ............... 356/425, 402, 405, 408; 250/226; 358/80

[56] References Cited

U.S. PATENT DOCUMENTS 4,670,780 6/1987 McManys et al. ...................... 358/80

OTHER PUBLICATIONS

Color in Business, Science & Industry–3rd Edition, pp. 141-143, Judd & Hyszecki John Wiley & Sons, 1975.

*Primary Examiner*—Vincent P. McGraw
*Assistant Examiner*—LaCharles P. Keesee
*Attorney, Agent, or Firm*—Armstrong, Nikaido, Marmelstein, Kubovcik, & Murray

[57] ABSTRACT

Herein disclosed is a method for mutual transformation between the data of a light-source color on a color CRT monitor and the light-source color. The transformation can be performed by using any of the following two formulas:

$$R_c(\lambda) = [I_c(\lambda)/I_g(\lambda)]R_G(\lambda);$$

and $$\begin{pmatrix} X \\ Y \\ Z \end{pmatrix} = \begin{pmatrix} x_R & x_G & x_B \\ y_R & y_G & y_B \\ z_R & z_G & z_B \end{pmatrix} \begin{pmatrix} k_R & f_1 & (R_C) \\ k_G & f_2 & (G_C) \\ k_B & f_3 & (B_C) \end{pmatrix},$$

wherein:

Both $R_c(\lambda)$, and X, Y and Z express the non-luminous object color data which are designated at a spectral reflectance factor and the CIE tristimulas values, respectively; and

Both $I_c(\lambda)$, and $R_c$, $G_c$ and $B_c$ express the light-source color data, which are designated at a spectral distribution and the RGB video drive signals, respectively.

Unknown parameters $R_G(\lambda)$ and $I_G(\lambda)$, and $K_R$, $K_G$ and $K_B$, which are used in the two formulas above, are determined by visual color matching under the Color Comparison Condition in which the light-source color on the color CRT monitor and the non-luminous object color are placed side by side so that they may be simultaneously observed.

12 Claims, 7 Drawing Sheets

METHOD OF TRANSFORMING LIGHT-SOURCE COLOR DATA AND NON-LUMINOUS OBJECT COLOR DATA

FIELD OF THE INVENTION

The present invention deals with both a) a method of transforming data of a light-source color displayed on a color cathode ray tube (CRT) monitor to a spectral reflectance factor (i.e., a type of non-luminous object color data) containing a spectral reflectance and a spectral radiance factor, and b) a method of mutually transforming video drive signals (i.e., a type of light-source color data) to and from the CIE tristimulus values (i.e., a type of non-luminous color data), and an apparatus thereof.

BACKGROUND OF THE INVENTION

In recent years, designing has been accomplished by using the Computer Color Graphic (CG) system for a wide range of industrial fields including fashion, automobiles, household electric appliances, printing and many other industries. The CG system is used not only to create images of schematic color designs but also to determine the final design colors accurately. Technology is necessary for accurately transmitting the light-source color, which is perceived and determined on the color CRT monitor of the CG system by the designer, to the production field as an equivalent non-luminous object color or data.

According to the prior art, for transmission of color on a color CRT monitor, a hard copy or photographic copy of the color on the color CRT monitor is prepared by a special camera or ink jet printer. The toning field operations, such as the Computer Color Matching (CCM) operation, are accomplished based on non-luminous object color data, a spectral reflectance factor or the CIE tristimulus values, which are obtained by colorimetry.

In this case, however, the light-source color data is transformed to non-luminous object color data by using the hard copy as a color transmission medium. Unfortunately, the hard copy cannot accurately reproduce the color perceived on the CG system by the designer because spectral characteristics of the phosphors of the color CRT monitor are fundamentally different from those of the ink or photographic coloring agent used in production of the hard copy. This means that the transformation from light-source color data to non-luminous object color data is seriously inaccurate, and that the step from the design stage to the toning field stage, using the CG system and the CCM, cannot effectively and accurately be achieved.

Therefore, the present procedure is hampered by inaccuracy in the color transmissions taken from the hard copy. From this embarrassing situation, the technology that allows the light-source color on the CG system determined by the designer to be transformed to non-luminous object color data directly from the CG system without using an intermediate medium, such as a hard copy, has come to be noted.

The technology involved in not using a color transmission medium uses a transformation formula for transforming the video drive signals of the color CRT monitor into the CIE tristimulus values X, Y, and Z (i.e., non-luminous object color data). (Journal of Imaging Technology, Volume 13, Number 4, August 1987).

In order to determine the transformation formula between the RGB video drive signals and the CIE tristimulus values of the non-luminous object color, according to the prior art thus far described, the chromaticity coordinates of a white light-source color in the white balance of the color CRT monitor is used as a parameter for determining the undetermined coefficients of the transformation formula.

However, this technology is accomplished in a situation which is absolutely different from that of a practical CRT observation, in which only one light-source color emitted over the entire color CRT monitor is observed in a dark room which inhibits perception of the surroundings of the color CRT monitor. A standard white light (i.e., the light having chromaticity coordinates coincident to those of the white balance) illuminating only the object placed in the vicinity of the color CRT monitor is prepared. The illuminance of the standard white light is adjusted so that the white light-source color on the color CRT monitor and the unreal, perfected reflecting diffuser are coincidentally perceived in brightness. Thus, the technology mentioned here is difficult to put into practical use.

SUMMARY OF THE INVENTION

Therefore, a primary object of the present invention is to provide a transformation method of accomplishing, without using any color transformation media, the transformations from the spectral distribution of a light-source color, displayed on a color CRT monitor, to the spectral reflectance factor of an object.

A color of this object can be perceived as matched with the light-source color (on the color CRT monitor) under realizable Color Comparision Condition between a light-source color on the color CRT monitor and a non-luminous object color. Moreover, by determining the spectral reflectance factor, the CIE tristimulus valves can be easily determined using the normal method.

A secondary object of the present invention is to provide a mutual transformation method capable of mutually transforming the RGB (red, green, blue) video drive signals of the light source color, displayed on the color CRT monitor, and the CIE tristimulus values of the non-luminous object color. The non-luminous object color and the light-source color on the color CRT monitor can be equally perceived by the human eyes under the realizable observation condition.

BRIEF DESCRIPTION OF THE DRAWINGS

FIGS. 2 to 6 showing a first embodiment of a method of transforming light-source color data to non-luminous object color data:

DETAILED DESCRIPTION OF THE INVENTION

The present invention will be described in the following in connection with the embodiments thereof with reference to the accompanying drawings.

Figure 1:
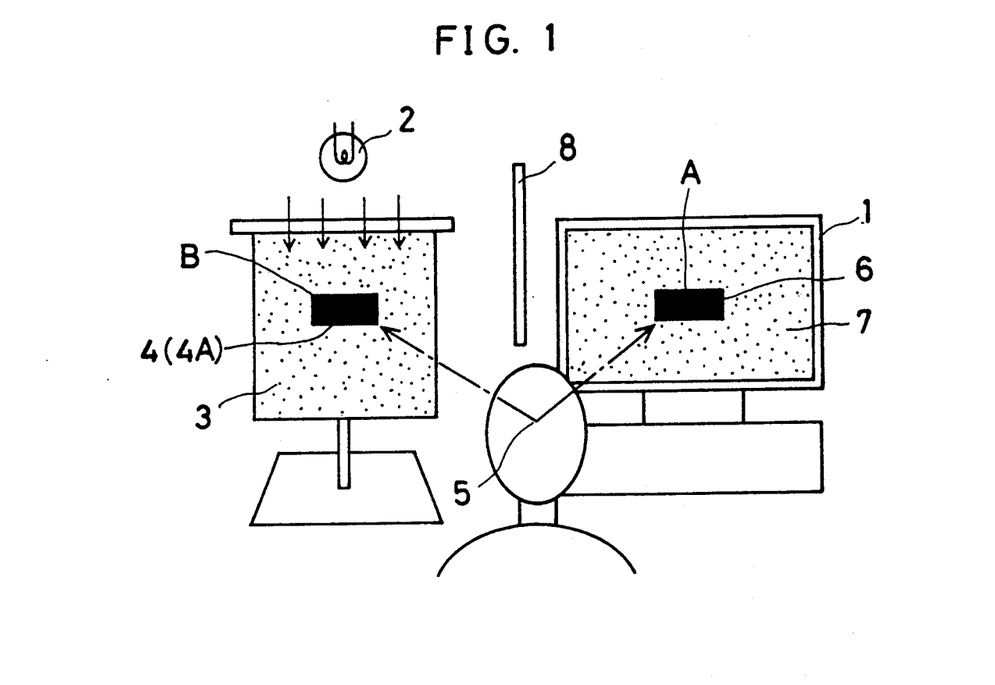
FIG. 1 is a schematic diagram showing the principle of the present invention.

FIG. 1 is a schematic diagram showing the principle of the present invention. A Color Comparision Condition is set under which an observer, such as a designer observing a color CRT monitor can simultaneously visually observe the non-luminous object color B under an observatory condition of the non-luminous object surface color, which is specified in Japanese Industrial Standards (JIS Z8723). If, under this Color Comparision Condition, a light-source color A, displayed on the color CRT monitor 1, and the non-luminous object color B are visually perceived as matched with each other by the observer, the light-source color data of the light source color A can be accurately transformed to the non-luminous object color data of a non-luminous object color B', which is equivalent to the non-luminous object color B. In FIG. 1: reference numeral 2 designates an illuminating light source; numeral 3 is the achromatic surroundings of the visual field of the non-luminous object color B; numeral 4 or 4A is a color chip or the non-luminous object color B; and the numeral 5 is the viewing point of the observer. Numeral 6 designates a toning region on the color CRT monitor 1, which is the same size as that of the color chip 4 or 4A. Numeral 7 designates the achromatic surroundings on the color CRT monitor 1, which may have an arbitrary luminance so long as it is perceived as an achromatic light-source color. Numeral 8 designates a glare shield for shielding the color CRT monitor 1 from the illumination of the light source 2.

The present invention will be described in the following in connection with the first embodiment.

Figure 2:
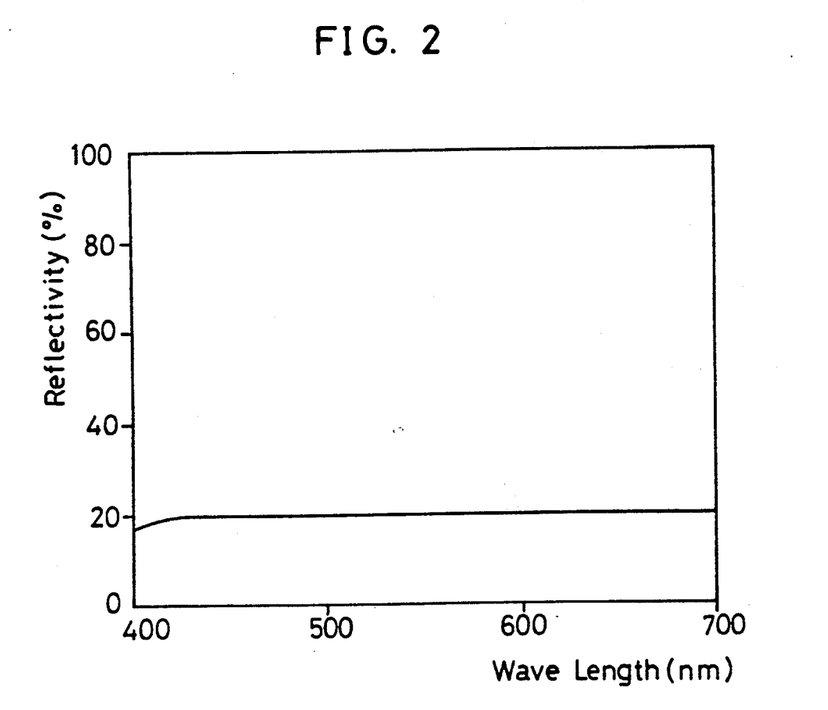
FIG. 2 is a graph presenting the spectral reflectance factor of an achromatic color chip (N5)
Figure 3:
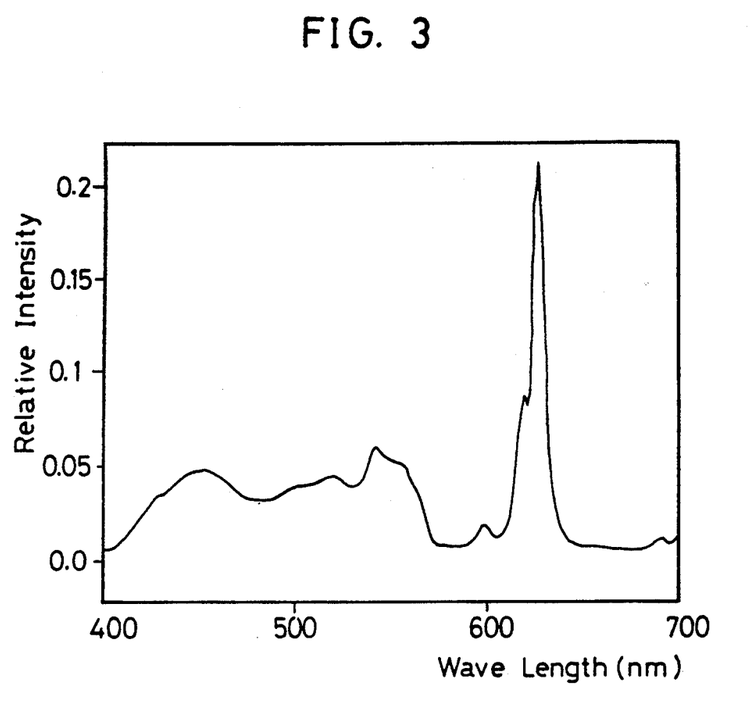
FIG. 3 is a graph presenting the spectral distribution of a light-source color which is perceived as matched with the achromatic color chip (N5) in a normalized visual lightness scale.

First of all, the standard source C 2, as the illuminating light source, and mat paper 3 of N6.5 are set under the Color Comparision Condition shown in FIG. 1. The brightness of the achromatic surrounding 7 is adjusted so that it is equally perceived with that of the mat paper 3 of N6.5, which is illuminated with the standard source C 2, when observed from the view point 5. A toning region 6 is set within the achromatic surrounding 7 which can tone an arbitrary light-source color. Under the Color Comparision Condition thus set, for eight Munsell color standard chips 4A of N9 to N2 or achromatic non-luminous object colors, each spectral reflectance factors $R_G(\lambda)$ is known, color matching with the light-source colors in the toning region 6 is performed by the human eye. The light-source colors are displayed one after another in the toning region 6 of the color CRT monitor 1 to normalize the visual lightness scale so that the spectral distribution $I_G(\lambda)$ of the light-source color (grey) is obtained. Therefore, the light-source color (grey) is produced by emitting all three phosphors (red (R), green (G) and blue (B)) of the color CRT monitor. FIG. 2 is a graph presenting the spectral reflectance factor of the achromatic color chip 4A (N5). FIG. 3 is a graph presenting the spectral distribution of the light-source color (grey) perceived as matched with the achromatic color chip 4A (N5) in the normalized visual lightness scale.

Next, under the Color Comparision Condition shown in FIG. 1, an arbitrary light-source color A is displayed in the toning region 6 on the color CRT monitor 1. The spectral distribution $I_C(\lambda)$ of the light-source color A is determined either by a direct measurement using a spectroradiometer or by the following formula. In the latter determination, measurements of the red, green and blue phosphor light intensities for each input signal are made in advance by individually switching on the three electron guns of the color CRT monitor.

$$I_C(\lambda) = f_1(R_C) i_R(\lambda) + f_2(G_C) i_G(\lambda) + f_3(B_C) i_B(\lambda),$$

wherein:

$R_C$, $G_C$ and $B_C$ are the RGB video drive signals of the color monitor;

$i_R(\lambda)$, $i_G(\lambda)$ and $i_B(\lambda)$ are the respective spectral distributions when red, green and blue phosphors of the color CRT monitor radiate by themselves with their maximum luminances; and $f_1$, $f_2$ and $f_3$ are the functions (or the gamma correction functions) for transforming the RGB video drive signals of the color CRT monitor to values corresponding to the phosphor-light-intensity outputs.

Thus, the spectral distribution $I_C(\lambda)$ of the light-source color A, the spectral distribution $I_G(\lambda)$ of the light-source color (grey) and the spectral reflectance factor $R_G(\lambda)$ of the achromatic color chip (N5) are determined. By substituting these three values $I_C(\lambda)$, $I_G(\lambda)$ and $R_G(\lambda)$ into the following formula, the spectral reflectance factor $R_C(\lambda)$ of a non-luminous object color B', which is perceived as matched with the light-source color A under the Color Comparision Condition, is determined from the spectral distribution $I_C(\lambda)$ of the light-source color A:

$$R_C(\lambda) = I_C(\lambda)/I_G(\lambda) \times R_G(\lambda) \tag{1}$$

Figure 4A:
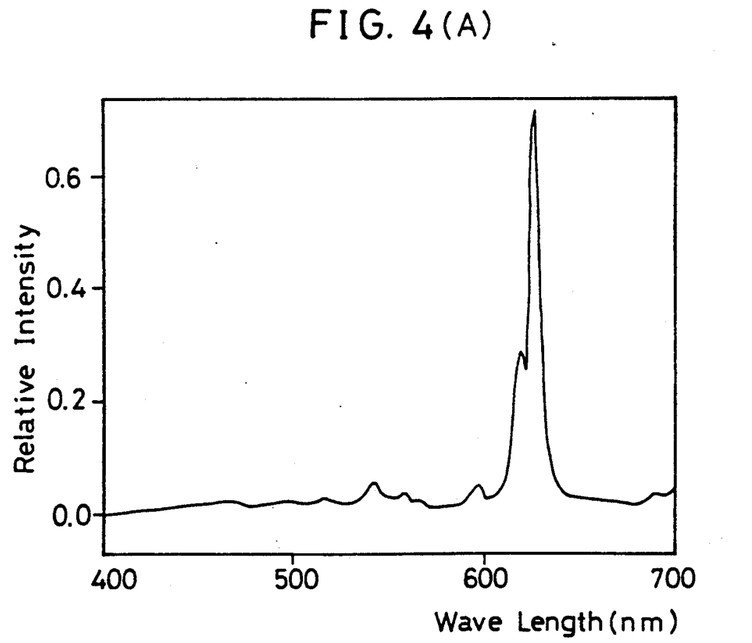
FIGS. 4(A), 4(B) and 4(C) are graphs presenting the spectral distributions of the light-source colors which are perceived as matched with respectively corresponding Munsell color standard chips or the non-luminous object color.
Figure 4B:
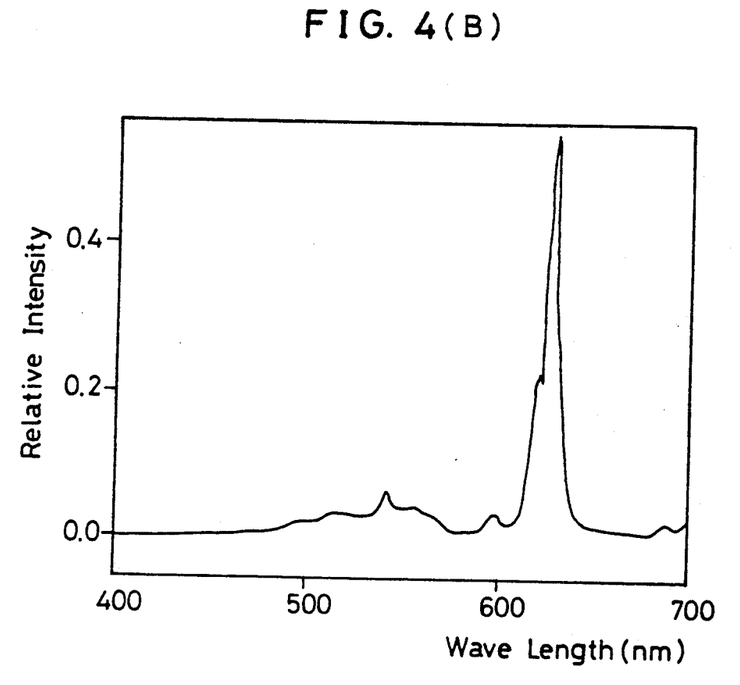
Figure 4C:
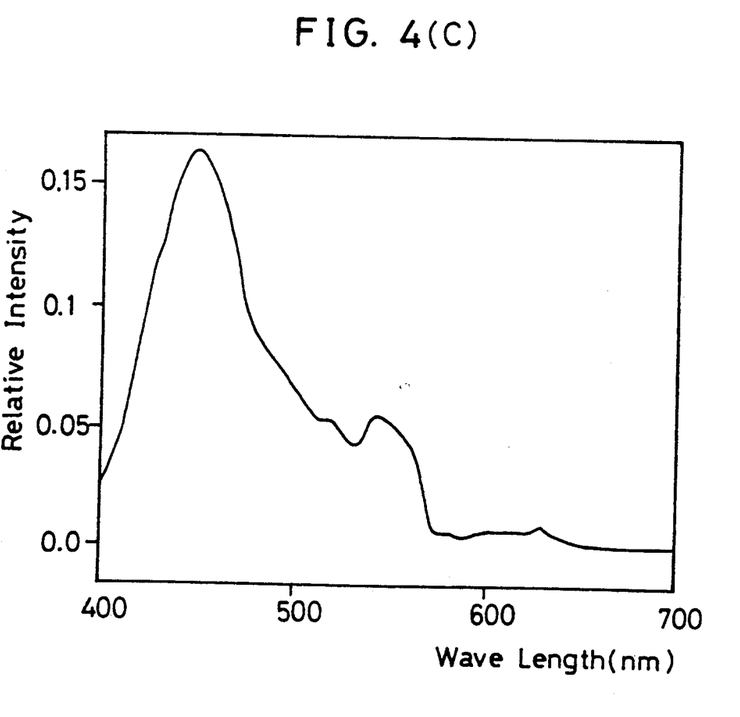

In this case, in order to compare the value determined from formula (1) with the measured value, the Munsell color standard chips 4 (e.g., 5R5/14, 5YR5/12 and 5PB5/12) or the non-luminous object colors B, which are perceived as matched with the aforementioned light-source color A under the aforementioned Color Comparison Condition, are selected for use as the test colors. FIG. 4(A) is a graph presenting the spectral distribution of the light-source color A which is perceived as matched with the Munsell colors standard chip 5R5/14. FIG. 4(B) is a graph presenting the spectral distribution of the light-source color A which is perceived as matched with the Munsell color standard chip 5YR5/12. FIG. 4(C) is a graph presenting the spectral distribution of the light-source colors A which are perceived as matched with the Munsell color standard chip 5PB5/12.

Figure 5A:
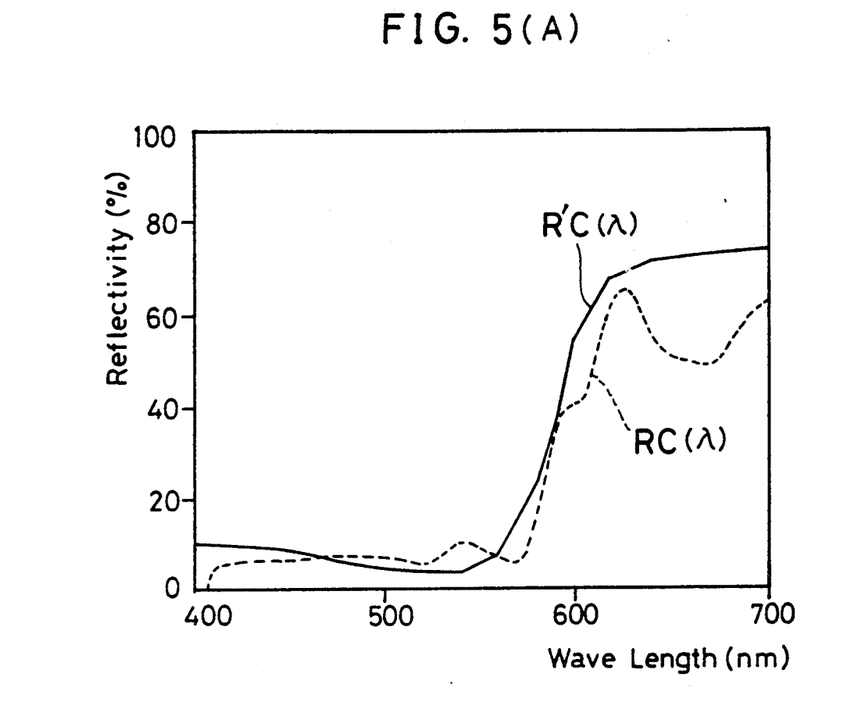
FIGS. 5(A), 5(B) and 5(C) are graphs comparing the spectral reflectance factors transformed from the spectral distributions of the light-source colors, as presented in FIGS. 4(A), 4(B) and 4(C), respectively, and the spectral reflectance factors of corresponding Munsell color standard chips.
Figure 5B:
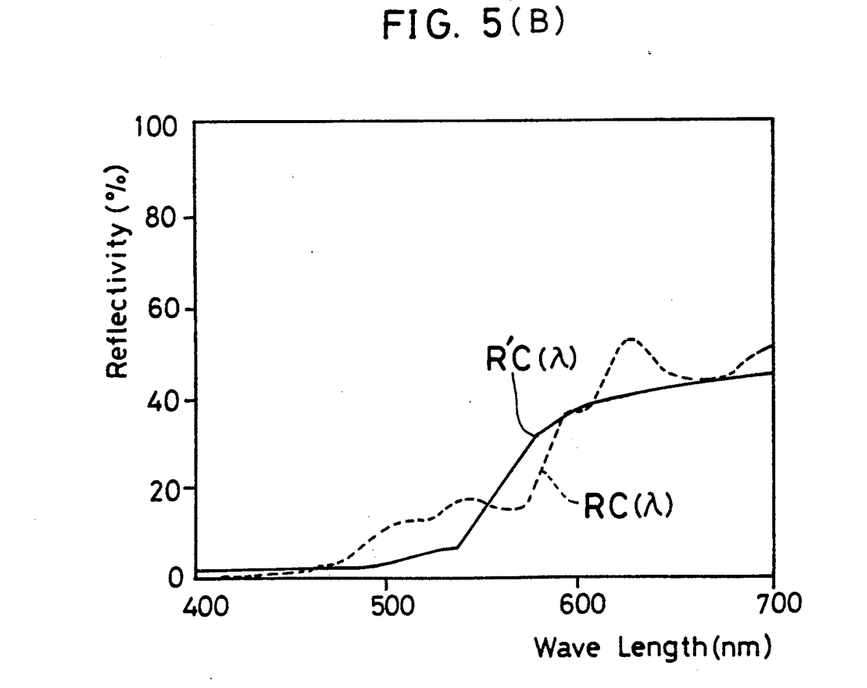
Figure 5C:
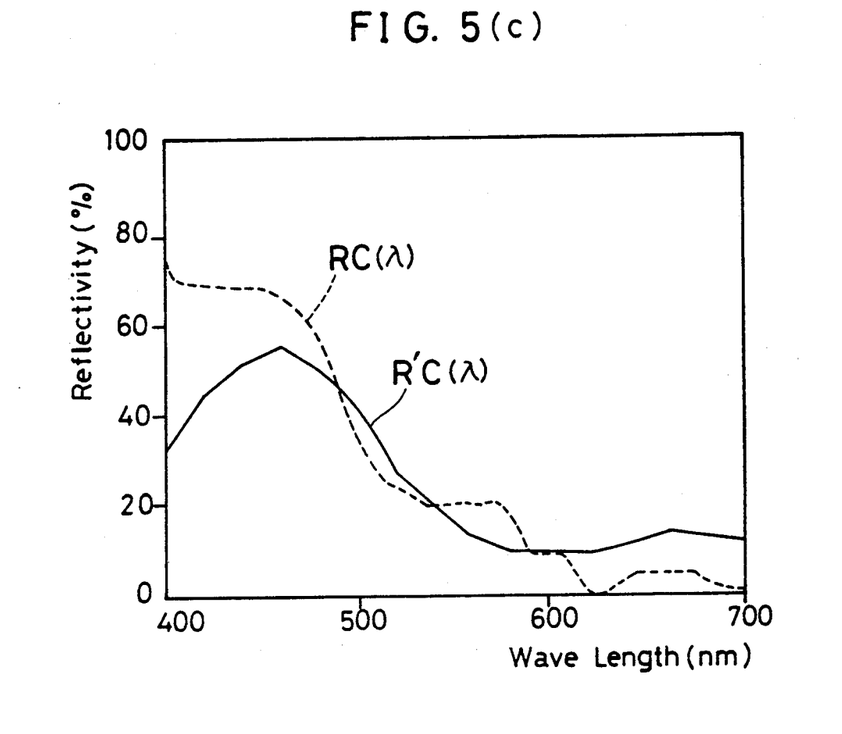

FIG. 5(A) is a graph presenting that spectral reflectance factor $R_C(\lambda)$ of the non-luminous object color B' (which is equivalent to the Munsell color standard chip 5R5/14,) which is determined from formula (1). FIG. 5(B) is a graph presenting the spectral reflectance factor $R_C(\lambda)$ of the non-luminous object color B'(which is equivalent to the Munsell color standard chip 5YR5/12)

which is determined from formula (1). FIG. 5(C) is a graph presenting the spectral reflectance factor $R_C(\lambda)$ of the non-luminous object color B'(which is equivalent to the Munsell color standard chip 5PB5/12) which is determined from formula (1). In these Figures, the measured spectral reflectance factor $R_{C'}(\lambda)$ of the Munsell color standard chip 4A is also presented for comparison.

Moreover, for a specified illuminant, the CIE tristimulus values X, Y and Z of the non-luminous object color B', having the spectral reflectance factor $R_C(\lambda)$ determined from formula (1), can be calculated by a normal method using the following formula (2):

$$\begin{pmatrix} X \\ Y \\ Z \end{pmatrix} = K \int_{380}^{780} L(\lambda) R_C(\lambda) \begin{pmatrix} x(\lambda) \\ y(\lambda) \\ z(\lambda) \end{pmatrix} d\lambda. \tag{2}$$

For a specified illuminant, on the other hand, the CIE tristimulus values X', Y' and Z' of the non-luminous object color B can be calculated from the following formula (3):

$$\begin{pmatrix} X' \\ Y' \\ Z' \end{pmatrix} = K \int_{380}^{780} L(\lambda) R_{C'}(\lambda) \begin{pmatrix} x(\lambda) \\ y(\lambda) \\ z(\lambda) \end{pmatrix} d\lambda. \tag{3}$$

As a result, the following formula (4) holds:

$$\begin{pmatrix} X \\ Y \\ Z \end{pmatrix} = \begin{pmatrix} X' \\ Y' \\ Z' \end{pmatrix}. \tag{4}$$

Letter $L(\lambda)$ designates the spectral distribution of the illuminating light source 2. Letters $x(\lambda)$, $y(\lambda)$ and $z(\lambda)$ designate the color matching functions based on the CIE 1931 standard colorimetric system (or the CIE 1964 supplementary standard colorimetric systems). Letter K is determined from the following formula (5):

$$K = 100 / \left( \int_{380}^{780} L(\lambda) y(\lambda) d\lambda \right. \tag{5}$$

Figure 6:
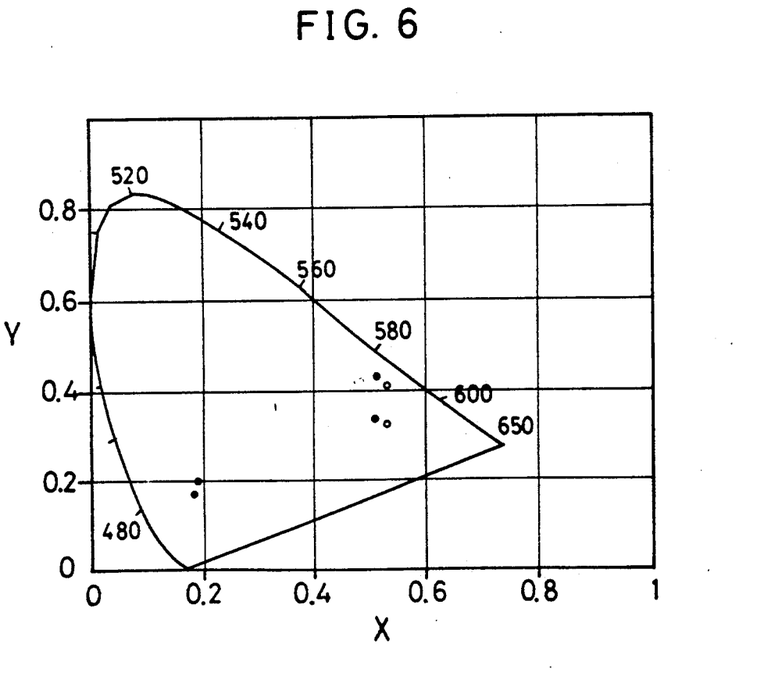
FIG. 6 is a chromaticity diagram.

The results, which confirm the holding of formula (4), are enumerated in Table 1. The chromaticity coordinates are presented in the chromaticity diagram of FIG. 6, and are enumerated in Table 2 as specifying the colors according to their three attributes based on the JIS Z8721. It has also been confirmed that the color differences in Tables 1 and 2, and FIG. 6 are within the range of errors allowed by visual observation with human eyes in color matching under the aforementioned Color Comparison Condition:

TABLE 1

| Test Colors | $R_C(\lambda)$ | | | $R_{C'}(\lambda)$ | | |
|---|---|---|---|---|---|---|
| | X | Y | Z | X' | Y' | Z' |
| 5 R 5/14 | 27.5 | 18.0 | 8.0 | 34.1 | 20.6 | 9.2 |
| 5 YR 5/12 | 25.5 | 21.1 | 2.7 | 25.6 | 19.8 | 2.6 |
| 5 PB 5/12 | 22.2 | 20.3 | 75.5 | 19.4 | 19.9 | 59.7 |

TABLE 2

| Test Colors | Non-Luminous Object Colors (B') | | Non-Luminous Object Colors (B) | |
|---|---|---|---|---|
| 5 R 5/14 | 7.2 R | 4.8/11.0 | 5.9 R | 5.1/13.7 |
| 5 YR 5/12 | 7.2 YR | 5.2/10.7 | 5.0 YR | 5.0/11.4 |
| 5 PB 5/12 | 5.7 PB | 5.1/13.6 | 4.2 PB | 5.0/10.8 |

Another method has been examined. With this method, for displaying the aforementioned light-source color (which should be perceived as matched with the aforementioned achromatic Munsell colors standard chip) in the toning region 6 on the color CRT monitor 1, both the light reflected from the color chip and the light-source color are measured. The aforementioned visual color matching is not performed with this method. However, this method is not superior to the method using visual observations, because many restrictions are placed on the measurements by taking optical considerations into the surroundings of both the color chip and the light-source color and into the measurement geometry, when a coincidence to the visual senses is considered.

A second embodiment of the present invention will be described in the following.

First of all, there is displayed in the toning region 6 of the color CRT monitor 1, the light-source color A, which is visually perceived as matched with the color standard chip 4 (having the known CIE tristimulus values X, Y and Z for the specified observing condition of the non-luminous object color B) under the set Color Comparision Condition. The RGB video drive signals of the light-source color A, at this time, are designated at $R_C$, $G_C$ and $B_C$. With these designations, however, the color standard chip 4 selected here should have a color in which any of the signals $R_C$, $G_C$ and $B_C$ is not zero in value. Then, undetermined coefficients $k_R$, $k_G$ and $k_B$ are determined by the following formula (6) using the above-specified CIE tristimulus values X, Y and Z of the non-luminous object color B and the above-specified RGB video drive signals $R_C$, $G_C$ and $B_C$ of the light-source color A. By using the coefficients $k_R$, $k_G$ and $k_B$ thus determined, the mutual transformations between the RGB video drive signals and the nonluminous object CIE tristimulus values are accomplished under the above-specified Color Comparision Condition:

$$\begin{pmatrix} X \\ Y \\ Z \end{pmatrix} = \begin{pmatrix} x_R & x_G & x_B \\ y_R & y_G & y_B \\ z_R & z_G & z_B \end{pmatrix} \begin{pmatrix} k_R f_1 (R_C) \\ k_G f_2 (G_C) \\ k_B f_3 (B_C) \end{pmatrix}. \tag{6}$$

Here:

$X_R$, $Y_R$ and $Z_R$ are the chromaticity coordinates of the red phosphor light of the color CRT monitor;

$X_G$, $Y_G$ and $Z_G$ are the chromaticity coordinates of the green phosphor light of the color CRT monitor;

$X_B$, $Y_B$ and $Z_B$ are the chromaticity coordinates of the blue phosphor light of the color CRT monitor;

$R_C$, $G_C$ and $B_C$ are the RGB video drive signals of the color CRT monitor; and $f_1$, $f_2$ and $f_3$ are the functions (or the gamma correction functions) for transforming the RGB video drive signals of the color CRT monitor to values corresponding to the phosphor-light-intensity outputs.

Next, the procedures for determining the undetermined coefficients $k_R$, $k_G$ and $k_B$ using formula (6) will be described in the following:

$$\begin{pmatrix} x_R & x_G & x_B \\ y_R & y_G & y_B \\ z_R & z_G & z_B \end{pmatrix} = M; \quad (7)$$

and $$R_0 = f_1(R_C); \quad (8)$$
$$G_0 = f_2(G_C); \quad (9)$$
$$B_0 = f_3(B_C). \quad (10)$$

Moreover, the formula (6) is rearranged into the following form by using the formulas (7), (8), (9) and (10):

$$\begin{pmatrix} X \\ Y \\ Z \end{pmatrix} = M \begin{pmatrix} R_0 & 0 & 0 \\ 0 & G_0 & 0 \\ 0 & 0 & B_0 \end{pmatrix} \begin{pmatrix} k_R \\ k_G \\ k_B \end{pmatrix}. \quad (11)$$

Then, the following formula (12) is obtained:

$$\begin{pmatrix} k_R \\ k_G \\ k_B \end{pmatrix} = \begin{pmatrix} R_0 & 0 & 0 \\ 0 & G_0 & 0 \\ 0 & 0 & B_0 \end{pmatrix}^{-1} M^{-1} \begin{pmatrix} X \\ Y \\ Z \end{pmatrix}. \quad (12)$$

Next, the undetermined coefficients $k_r$, $k_G$ and $k_B$ are determined by substituting into formula (12) both the $R_O$, $G_O$ and $B_O$, which are determined by substituting the RGB video drive signals $R_C$, $G_C$ and $B_C$ of the light-source color A into the formulas (8), (9) and (10), and the CIE tristimulus values X, Y and Z of the non-luminous object color B.

Then, the light source color A and the non-luminous object color B can be mutually transformed, as expressed by the following formulas (14) and (15), with the replacement of the following formula (13):

$$M \begin{pmatrix} k_R & 0 & 0 \\ 0 & k_G & 0 \\ 0 & 0 & k_B \end{pmatrix} = K; \quad (13)$$

$$\begin{pmatrix} X \\ Y \\ Z \end{pmatrix} = K \begin{pmatrix} f_1(R_C) \\ f_2(G_C) \\ f_3(B_C) \end{pmatrix}; \quad (14)$$

and $$\begin{pmatrix} f_1(R_C) \\ f_2(G_C) \\ f_3(B_C) \end{pmatrix} = K^{-1} \begin{pmatrix} X \\ Y \\ Z \end{pmatrix}. \quad (15)$$

Next, the embodiment to be described is directed to the case in which the color CRT monitor is exemplified by the color graphic design system SDS-380 of Shima Seiki Seisakusho (KK) (CRT: C-6919JG of Mitsubishi Denki (KK) using 256 steps of RGB video drive signals.)

The functions $f_1$, $f_2$ and $f_3$ of this CRT are expressed by the following formulas (16), (17) and (18) if quartic polynominals are used:

$$f_1(R_C) = -1.348 \cdot 10^{-2} + 0.1712 R_C - 5.311 \cdot 10^{-3} R_C^2 + \quad (16)$$
$$6.275 \cdot 10^{-5} R_C^3 - 1.144 \cdot 10^{-7} R_C^4,$$

$$f_2(G_C) = 1.779 \cdot 10^{-2} + 0.0347 G_C - 2.932 \cdot 10^{-3} G_C^2 + \quad (17)$$
$$4.216 \cdot 10^{-5} G_C^3 - 6.205 \cdot 10^{-8} G_C^4,$$

and $$f_3(B_C) = 8.372 \cdot 10^{-2} + 0.4161 B_C - 9.841 \cdot 10^{-3} B_C^2 + \quad (18)$$
$$7.772 \cdot 10^{-5} B_C^3 - 1.183 \cdot 10^{-7} B_C^4.$$

On the other hand, the matrix M expressed with the chromaticity coordinates of the red (R), green (G) and blue (B) phosphor lights takes the form of the following formula:

$$M = \begin{pmatrix} x_R & x_G & x_B \\ y_R & y_G & y_B \\ z_R & z_G & z_B \end{pmatrix} = \begin{pmatrix} 0.6306 & 0.2644 & 0.1485 \\ 0.3391 & 0.6208 & 0.0690 \\ 0.0303 & 0.1148 & 0.7825 \end{pmatrix}. \quad (19)$$

If the non-luminous object color in the achromatic surrounding of N6.5 is observed, where the illuminance on the nonluminous object color by using the standard source is 740 luxes, and if the surrounding light-source color on the color CRT monitor is set as an achromatic light-source color having approximately the same brightness as that reflected from the surrounding of the non-luminous object color, the RGB video drive signals of the light-source color (on the color CRT monitor) perceived as matched with the achromatic color standard chip (X=19.39, Y=19.77 and Z=23.37) are $R_C=139$, $G_C=136$ and $B_C 133$. Therefore, the matrix K determined under this Color Comparison Condition is expressed by the following formula (20):

$$K = \begin{pmatrix} 0.2162 & 0.1506 & 0.1437 \\ 0.1163 & 0.3535 & 0.0668 \\ 0.0104 & 0.0654 & 0.7571 \end{pmatrix}. \quad (20)$$

From the formulas (8), (9), (10), (14), (15) and (20), the mutual transformation formulas of (RGB)→(XYZ) and (XYZ)→ (RGB) are determined, as expressed by formulas (21) and (22):

It has been confirmed by five normal color vision men for some arbitrary colors that the following mutual transformation formulas (21) and (22) are correct for the color expression range of the color CRT monitor under the above-specified Color Comparison Condition:

$$X = 0.2162 R_0 + 0.1506 G_0 + 0.1437 B_0, \quad (21)$$
$$Y = 0.1163 R_0 + 0.3535 G_0 + 0.0668 B_0$$
and
$$Z = 0.0104 R_0 + 0.0654 G_0 + 0.7571 B_0;$$
and
$$R_0 = 5.9369 X - 2.3587 Y - 0.9187 Z, \quad (22)$$
$$G_0 = -1.9697 X + 3.6582 Y + 0.0512 Z$$
and
$$B_0 = 0.0886 X - 0.2835 Y + 1.3290 Z.$$

Another method of determining the coefficients $k_R$, $k_G$ and $k_B$ has also been examined. With this method, both the light reflected from the color standard chip (having the know CIE tristimulus values X, Y and Z) and the light-source color (in the toning region 6 of the CRT monitor 1) are measured. The aforementioned visual color matching is not performed with this method. However, this method is not superior to one using visual observations, because many restrictions are placed on the measurements by taking into account optical considerations into the surroundings of both the non-luminous object color and the light-source color and into the measurement geometry, when a coincidence to the visual senses is considered.

Figure 7:
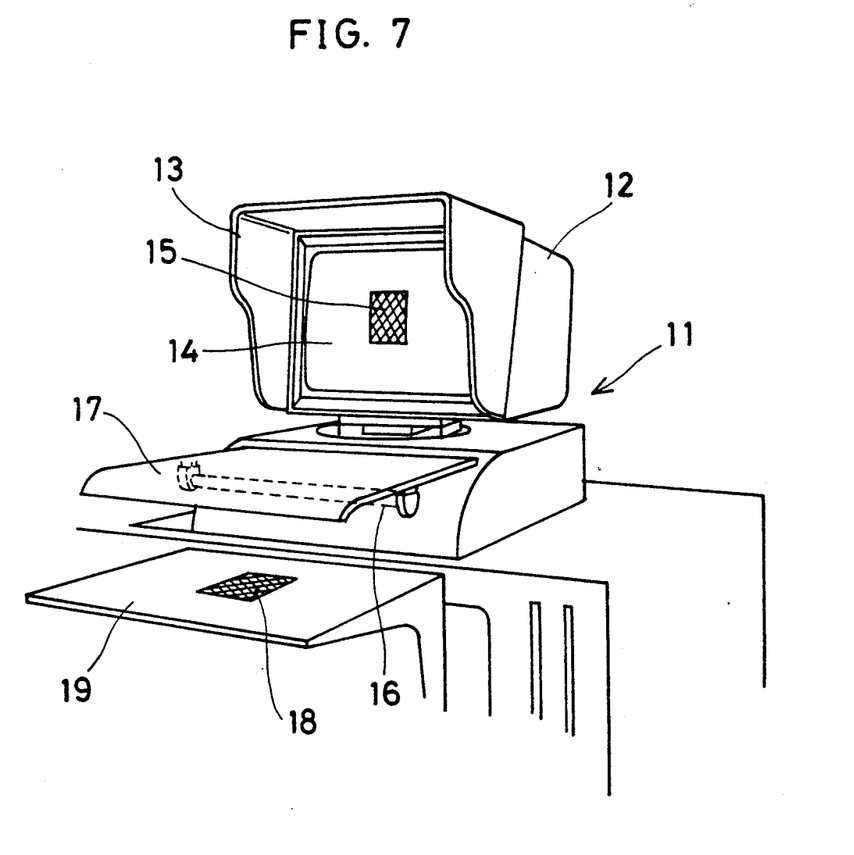
FIG. 7 is a general perspective view of the first embodiments of the color comparator according to the present invention.

FIG. 7 is a general perspective view of the first embodiments of the color comparator according to the present invention, and 11 represents the computer color graphic (CG) system. A color CRT monitor hood 13 is provided on the front part of color CRT monitor 12 of CG 11, and an illuminating light-source 16 such as the standard C light-source is furnished on lower front portion of the color CRT monitor 12. A shielding plate 17 is provided between the color CRT monitor screen 14 and the illuminating light source 16 so that the light from the illuminating light source 16 may not enter color CRT monitor screen 14.

When the non-luminous object color and the light-source color are to be compared, the specimen 18 such as a color specimen, sample, color chip, etc. is placed on the table 19 under the illuminating light source 16 to give adequate light on the specimen 18. By observing the non-luminous object color of the specimen 18 under adequate conditions, the changes of color due to an isochromatic condition can be avoided. Also, by having color CRT monitor hood 13 furnished on color CRT monitor 12, the reflection of the external light is prevented, and the light from the illumination light source 16 can also be blocked by the shielding plate 17 mounted between them. This makes it possible to see the color comparison condition to compare the color of the light-source color 15 in the toning region on the color CRT monitor screen 14 and the non-luminous object color.

Figure 8:
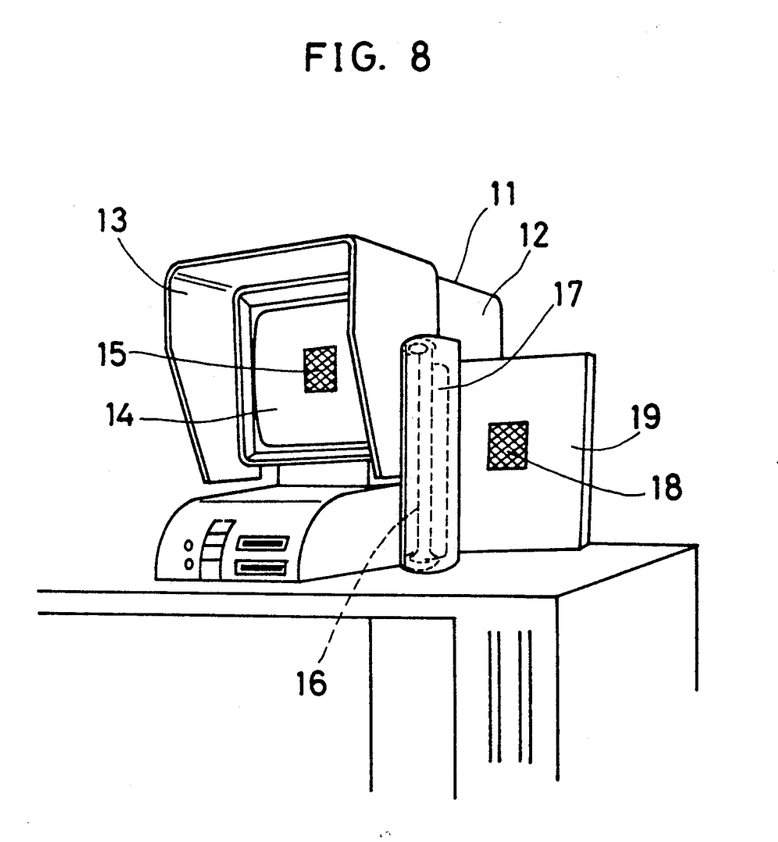
FIG. 8 is the second embodiment of the color comparator.

FIG. 8 is the second embodiment of the color comparator. A color CRT monitor hood 13 is provided on the front portion of color CRT monitor 12 of CG 11. Also, an illuminating light-source 16 is furnished on the side of the color CRT monitor 12. A shielding plate 17 is provided between the lateral portion of color CRT monitor 12 and the illuminating light source 16 so that the light from the illuminating light source 16 may not enter the color CRT monitor screen 14. The specimen 18 to be observed is placed on the side of color CRT monitor unit 12, and the non-luminous object color of the specimen 18 lightened with adequate illuminating light source 16 and the light-source color 15 on color CRT monitor screen 14 can be compared. This makes it possible to set up the adequate condition to compare the color in the way similar to the example of FIG. 7 and to observe and compare the light-source color and the non-luminous object color on the same level.

The present invention should not be limited to the embodiments thus far described but could be modified in various manners within its scope.

From the foregoing description of the preferred embodiment of the invention, it will be apparent that many modifications may be made therein. It should be understood that these embodiments are intended as one example of the invention only, and that the invention is not limited thereto. Therefore, it should be understood that the appended claims are intended to cover all modifications that fall within the true spirit and scope of the invention.

What is claimed is:

1. A method of transforming a light-source color on a color cathode ray tube (CRT) monitor to a spectral reflectance factor, the method comprises the step of:
    setting a Color Comparison Condition, in which a light-source color, surrounded with an achromatic light-source color on said color CRT monitor, and a non-luminous object color, surrounded with an achromatic surrounding in a visual field, can be simultaneously observed;
    determining a spectral reflectance factor $R_C(\lambda)$ of an object, with can be perceived as matched with an arbitrary light-source color on said color CRT monitor under said Color Comparison Condition, based on the spectral distribution $I_C(\lambda)$ of said arbitrary light-source color using the following formula:

$$R_C(\lambda) = I_C(\lambda)/I_G(\lambda) \times R_G(\lambda) \quad (1)$$

wherein:
    $I_G(\lambda)$ is a spectral distribution of the light-source color, which is perceived as matched with a color chip, having a spectral reflectance factor;
    $R_G(\lambda)$, under said Color Comparison Condition and is produced by emitting all three phosphors (red (R), green (G) and blue (B)) of said color CRT monitor; and
    $I_C(\lambda)$ is the spectral distribution of said arbitrary light-source color displayed on said color CRT monitor under said Color Comparison Condition.

2. A transformation method according to claim 1, wherein surrounding light-source color on said color CRT monitor is able to have an arbitrary luminance so long as it is perceived as an achromatic color.

3. A transformation method according to claim 1, wherein said non-luminous object color and achromatic surrounding are illuminated with a standard light under said Color Comparison Condition.

4. A transformation method according to claim 1, wherein said color CRT monitor is not illuminated with a standard light under said Color Comparison Condition.

5. A transformation method according to claim 1, wherein said achromatic surrounding of said non-luminous object color is produced by a mat paper or the like conforming to JIS Z8723 which specifies the type of comparison for surface color.

6. A method of mutually transforming RGB video drive signals of a color CRT monitor and CIE tristimulus values of a non-luminous object color, said method comprises the steps of:
    setting a Color Comparison Condition, under which a light-source color, surrounded with an achromatic light-source color on said color CRT monitor, and a non-luminous object color, surrounded with an achromatic surrounding of a visual field, can be simultaneously observed;
    determining undetermined coefficients $k_R$, $k_G$ and $k_B$ from both known CIE tristimulus values X, Y and Z to a non-luminous object color and the RGB video drive signals $R_C$, $G_C$ and $B_C$ of a light-source color (which is perceived as matched with said non-luminous object color by the human eye under said Color Comparison Condition an is produced by emitting all three phosphors (red (R), green (G) and blue (B)) of said color CRT monitor)using the following formula:

$$\begin{pmatrix} X \\ Y \\ Z \end{pmatrix} = \begin{pmatrix} x_R & x_G & x_B \\ y_R & y_G & y_B \\ z_R & z_G & z_B \end{pmatrix} \begin{pmatrix} k_R f_1(R_C) \\ k_G f_2(G_C) \\ k_B f_3(B_C) \end{pmatrix}, \quad (2)$$

wherein:

$x_R$, $y_R$ and $z_R$ are chromaticity coordinates of red phosphor light of the color CRT monitor;

$x_G$, $y_G$ and $z_G$ are chromaticity coordinates of green phosphor light of the color CRT monitor;

$x_B$, $y_B$ and $z_B$ are chromaticity coordinates of blue phosphor light of the color CRT monitor;

$R_C$, $G_C$ and $B_C$ are the RGB video drive signals of the color CRT monitor; and $f_1$, $f_2$ and $f_3$ are functions (or the gamma correction functions) for transforming the RGB video drive signals of the color CRT monitor to values corresponding to the phosphor-light-intensity outputs; and mutually transforming an arbitrary light-source color on said color CRT monitor and a non-luminous object color which is perceived as matched with the arbitrary light-source color under said Color Comparison Condition by using said determined coefficients $k_R$, $k_G$ and $k_B$ in said formula.

7. A mutual transformation method according to claim 6, wherein surrounding light-source color on said color CRT monitor is able to have an arbitrary luminance so long as it is perceived as an achromatic color.

8. A mutual transformation method according to claim 6, wherein said non-luminous object color and achromatic surrounding are illuminated with a standard light under said Color Comparison Condition.

9. A mutual transformation method according to claim 6, wherein said color CRT monitor is not illuminated with a standard light under said Color Comparison Condition.

10. A mutual transformation method according to claim 6, wherein said achromatic surrounding of said non-luminous object color is produced by a mat paper or the like conforming to JIS Z8723 which specifies the method of comparison for surface color.

11. A mutual transformation method according to claim 6, wherein said non-luminous object color, such as a color chip, in said achromatic surrounding of the visual field used for determining said coefficients $k_R$, $k_G$ and $k_B$, is perceived as matched with a light-source color which can be displayed on said color CRT monitor in said Color Comparison Conditions, and said light-source color is produced by emitting all three phosphors (red (R), green (G) and blue (B)) of said color CRT monitor.

12. A color comparator system to compare the non-luminous object color and the light-source color for simultaneous observation of the light-source color displayed on the screen of color CRT monitor and the non-luminous object color, comprising:

a color CRT monitor unit to display said light-source color;

an illuminating light-source to illuminating said specimen mounted near said monitor unit; and a shielding plate furnished between said illuminating light-source and said monitor unit.

* * * * *